United States Patent [19]

Davier

[11] Patent Number: 4,702,625

[45] Date of Patent: Oct. 27, 1987

[54] CENTRIFUGAL DECANTERS OF THE PENDULUM TYPE

[75] Inventor: Jean-Pierre Davier, Lyons, France

[73] Assignee: Robatel Slpi, Genas, France

[21] Appl. No.: 823,860

[22] Filed: Jan. 29, 1986

[30] Foreign Application Priority Data

Feb. 8, 1985 [FR] France ............................ 85 02012

[51] Int. Cl.$^{4}$ ............................ F16C 27/08

[52] U.S. Cl. ............................ 384/428; 248/638; 384/230

[58] Field of Search ............................ 52/167; 68/23.3; 248/636, 638; 384/227, 230, 232, 234, 239, 428, 624; 494/82, 84

[56] References Cited

U.S. PATENT DOCUMENTS

| | | | |
|---|---|---|---|
| 1,857,193 | 5/1932 | Hopp | 248/638 X |
| 2,513,844 | 7/1950 | Castner et al. | 68/23.3 |
| 3,043,435 | 7/1962 | Castricone | 68/23.3 X |
| 3,132,098 | 5/1964 | Bochan | 68/23.3 X |
| 3,212,745 | 10/1965 | Lode | 52/167 X |
| 4,468,938 | 9/1984 | McMillan | 68/23.3 |

*Primary Examiner*—Daniel P. Stodola

*Attorney, Agent, or Firm*—Dowell & Dowell

[57] ABSTRACT

In order to limit the horizontal displacement of the rotating assembly of the decanter at transitory speeds consecutive for example to an earthquake or other outside disturbance, a second series of shock absorbers is provided, disposed about the conventional shock absorbers and interposed, like the latter, between the bearing and the fixed frame, the operational characteristics of the shock absorbers of the two series being, of course, different so that those of the second series do not disturb the normal role of those of the first series.

3 Claims, 3 Drawing Figures

CENTRIFUGAL DECANTERS OF THE PENDULUM TYPE

BACKGROUND OF THE INVENTION

1. Field of the Invention

The present invention relates to centrifugal decanters of the pendulum type and more particularly to those in which the rotor and the frame containing the swivel joint drive mechanism are separated from each other by a horizontal protecting slab.

2. History of the Art

In machines of this type, the vertical shaft which connects the drive motor to the rotor and which passes through the protecting slab is known to be mounted in an oscillating sleeve or bearing provided with an annular bearing surface of semispherical profile which rests on a fixed dish of corresponding concave profile. This conventional arrangement allows self-alignment of the rotor and thus avoids the effects of the inevitable unbalance of said rotor during its rotation at high speed. Of course, shock absorbers are provided, disposed between a flange fast with the bearing and the outer edge of the dish, the purpose of these absorbers being to dampen the oscillations of the pendular assembly at normal operational speeds.

However, it may happen, particularly in the event of an earthquake, that the amplitude of the oscillation of the vertical shaft increases suddenly due to the appearance of considerable vibrations or a marked unbalance of the rotor; in such a case, the shaft risks coming into contact with a fixed part, for example the edge of the opening made in the slab for passage thereof, and it goes without saying that such a shock may prove to be highly dangerous, particularly when the liquid being treated is of radio-active or very strongly corrosive nature.

With a view to setting aside this risk, it has been proposed to provide the decanters with the safety system shown in FIG. 1 of the accompanying drawings. In this figure, reference 1 designates the vertical shaft which connects the upper motor 2 to the rotor or rotating decantation vessel 3, said shaft being engaged with clearance through an opening 4*a* made in the protecting slab 4; below its pivoting part, the bearing 5 which serves to guide the shaft 1 receives a control piece 6 provided at its base with a semi-spherical bead housed, with a clearance which is as small as possible, inside the central opening of a bell-shaped member 7, the free edge of the latter being engaged in an annular depression 4*b* made in the upper face of the slab 4 concentrically to the opening 4*a*.

Depression 4*b* is filled with oil and between the free edge of the bell 7 and the bottom of said depression are inserted balls or other sliding elements, with the result that, when, under the effect of an exaggerated pendular movement of the shaft 1, consecutive in particular to an earthquake, the piece 6 moves said bell horizontally, the outer edge of the latter bears against the corresponding edge of the depression 4*b*, limiting the amplitude of he angular movement to a value which avoids any contact between the shaft 1 or rotor 3 and a fixed part of the machine. The assembly 6–7 consequently acts as a safety means which completes the damping effected by the conventional shock absorbers 8 and the lateral spring 9 which may be associated therewith.

Despite appearances, this solution is not entirely satisfactory. In fact, it eliminates the aptitude of the pendular assembly to ensure self-alignment of the rotor beyond a certain unbalanced mass; it will be readily understood that, as soon as the bell-shaped member 7 comes into contact with the edge of the depression 4*b*, the dynamic operation of the rotor 3 passes suddenly from pendular mode on swivel joint to the mode of a shaft fitted between rigid roller bearings, so that, taking into account the importance of the mass in rotation and of its overhang, the dynamic forces generated at that moment are such that they may cause permanent deformation of the shaft 1 whose rotor 3 may then come into contact with the adjacent fixed parts. The risks which it was hoped to eliminate thus remain.

SUMMARY OF THE INVENTION

It is an object of the present invention to overcome the above mentioned drawback, by essentially limiting the exaggerated oscillations of the swivel joint by dissipation of part of the vibratory energy into a second series of shock absorbers disposed about the conventional first series, the operational characteristics of the shock absorbers of this second series being such that they do not hinder the normal pendular movement of the rotating assembly.

BRIEF DESCRIPTION OF THE DRAWINGS

The invention will be more readily understood on reading the following description with reference to the accompanying drawings, in which.

DESCRIPTION OF THE PREFERRED EMBODIMENT

Figure 1:
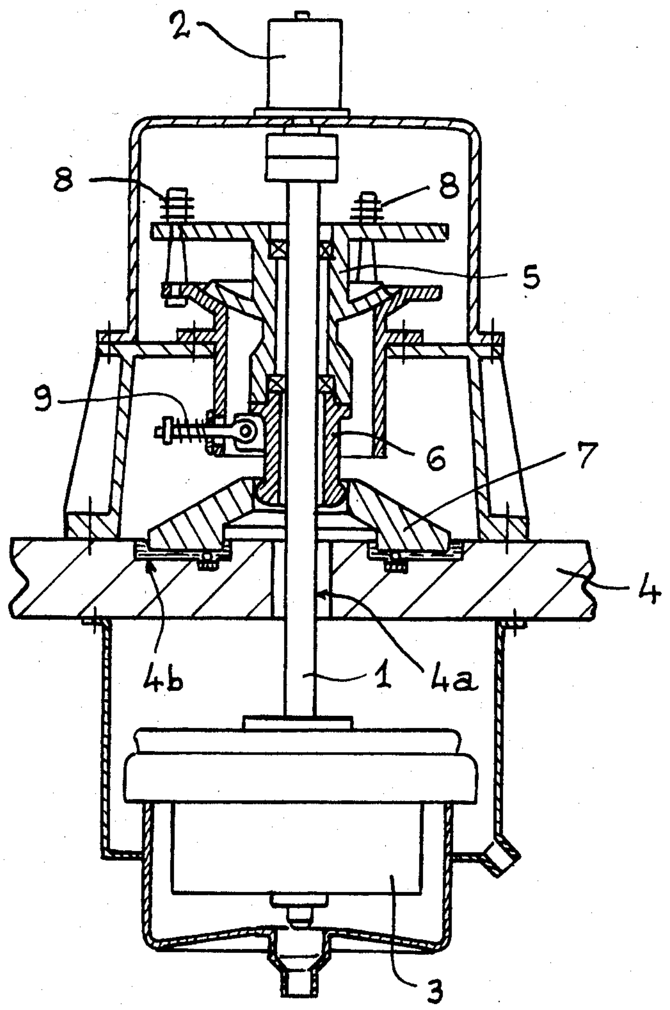
PRIOR ART Fig. 1
FIG. 1, as indicated hereinabove, is a schematic axial section illustrating the solution proposed heretofore for limiting the pendular oscillation of the swivel joint of a centrifugal decanter.
Figure 2:
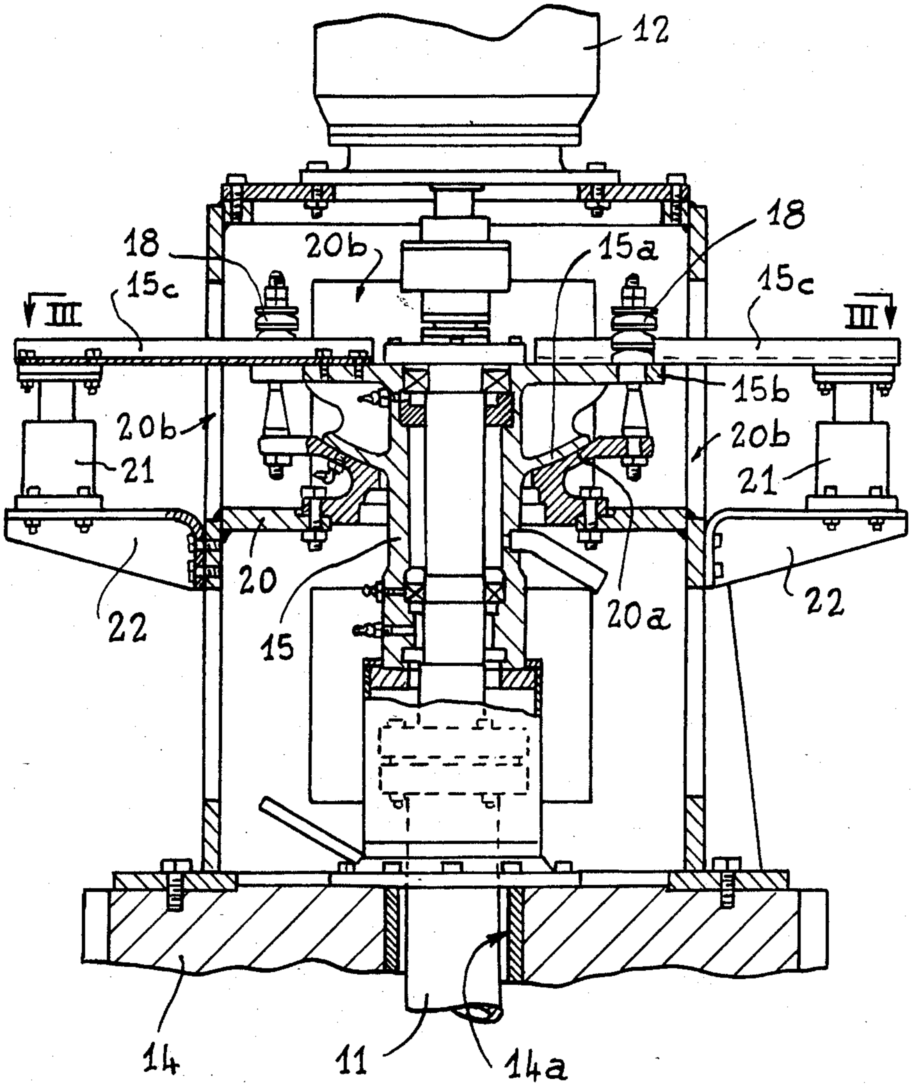
FIG. 2 is a partial axial section on a larger scale showing the solution according to the present invention.

Referring again to the drawings, FIG. 2 shows a vertical shaft 11 whose upper end is connected to a drive motor 12, whilst its lower part, adapted to be fixed to the rotor or vessel (not shown), passes through an opening 14*a* made in a horizontal protecting slab 14. The intermediate part of shaft 11 included between the motor 12 and the opening 14*a* is maintained, via two superposed roller bearings, in a sleeve or bearing 15 provided with an annular bearing surface 15*a* of semi-spherical section, which bearing surface rests on a concave dish 20*a* fast with the general frame 20 of the machine. The pendular freedom thus given to the rotating assembly is limited by a series of shock absorbers 18 fixed vertically between an upper flange 15*b* of the bearing 15 and the outer edge projecting from the concave dish 20*a*.

Figure 3:
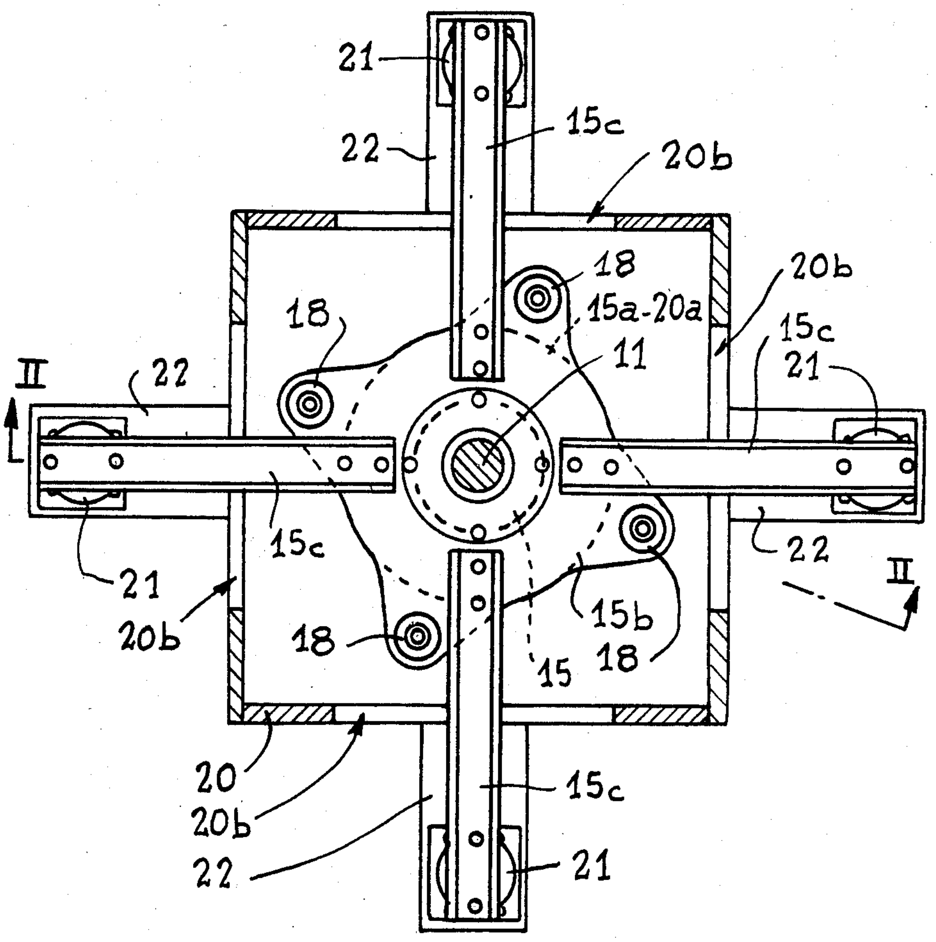
FIG. 3 is a horizontal section along the plane III—III in FIG. 2; in this Figure, the plane of section II—II of FIG. 2 is indicated.

In accordance with the present invention, a second series of shock absorbers, referenced 21, is provided, of which the two constituent members are respectively fixed to small beams 15*c* fast with the flange 15*b* mentioned above and to brackets 22 added laterally against the frame 20. It will be observed that the beams 15*c* pass through openings 20*b* made in the frame 20 so that the shock absorbers 21 are disposed outside the latter, the brackets 22 themselves facing the outside. FIG. 3 clearly shows the respective position of the two concentric series of shock absorbers 18 and 21.

It should be observed that the shock absorbers 21 may be of any known type (hydraulic, hydropneumatic, pneumatic, visco-elastic, etc. . . ) and that their number, orientation and arrangement may vary to a very wide extent. In any case, these shock absorbers 21 are calculated so as to present operational characteristics different from those of shock absorbers 18; under these conditions, the latter continue to perform their conventional role, namely the elastic limitation of the amplitude of the pendular displacements of the rotating assembly of the decanter at normal operational speeds, without being hindered in any way by the outer shock absorbers 21. On the other hand, the latter dampen the pendular oscillations of the rotating assembly at all transitory speeds, i.e. during critical changes of speeds, in the case of unbalance of the rotor or change of internal physical state of the swivel joint 15*a*–20*a* consecutive to an accidental seizure, or further to an earthquake or other outside disturbance. During such transitory states, the shock absorbers 21 reduce the amplitude of the horizontal displacements of the rotor and effectively avoid the risks of damage by contact of said rotor with any fixed part.

It will be noted that the amount of energy dissipated in the shock absorbers 21 increases at the same time as the amplitude of the pendular oscillations, with the result that the performances of the safety system thus elaborated automatically adapt to the importance of the disturbing unbalance and that a self-regulation of the dynamic operation of the decanter is finally obtained.

It must, moreover, be understood that the foregoing description has been given only by way of example and that it in no way limits the domain of the invention which would not be exceeded by replacing the details of execution described by any other equivalents.

What is claimed is:

1. In a pendulum-type centrifugal decanter having a vertical drive shaft suspended downwardly within a frame from a motor mounted to the frame in which a roller bearing sleeve is mounted so as to encircle the drive shaft, the roller bearing sleeve being adjustably mounted with respect to a vertically oriented concave bearing surface which is secured to the frame by a plurality of vertically oriented first shock absorber members which are mounted within the frame and around the drive shaft and roller bearing sleeve so as to permit limited pendular movement of the vertical drive shaft, the improvement comprising a plurality of second shock absorber means which are vertically oriented and mounted to the exterior of the frame, a plurality of horizontally extending beams having inner and outer ends extending outwardly from within the frame, said beams being secured at their inner ends to the roller bearing sleeve, said second shock absorber means being connected to said outer ends of said beams whereby said second shock absorber means reduce the amplitude of displacement of the drive shaft during periods when the frame is subjected to increased disturbances.

2. The pendulum-type centrifugal decanter of claim 1 in which said roller bearing sleeve includes a first outwardly extending flange portion, the first shock absorbing members being connected between said first outwardly extending flange portion and said bearing surface and said inner ends of said beams being secured to said first outwardly extending flange portion of said roller bearing sleeve inwardly of and adjacent each of said first shock absorbing members.

3. The pendulum-type centrifugal decanter of claim 2 including a plurality of horizontal bracket means mounted to the exterior of the frame, each of said second shock absorber means mounted to one of said bracket means.

* * * * *